United States Patent Office 3,216,795
Patented Nov. 9, 1965

3,216,795
MANUFACTURE OF BORIC ACID
Michael Peter Brown, Tolworth, and William Jeffers, East Molesey, England, assignors to United States Borax & Chemical Corporation, a corporation of Nevada
No Drawing. Filed Apr. 27, 1961, Ser. No. 105,860
Claims priority, application Great Britain, May 7, 1960, 16,225/60
1 Claim. (Cl. 23—149)

This invention relates to the production of boric acid.

It is an object of the invention to provide a method of readily obtaining boric acid from alkali-metal borates in which the product is of a higher degree of purity than is obtainable by the conventional processes.

According to the present invention, a method of making boric acid comprises treating an aqueous solution of an alkali-metal borate with a cation-exchange resin having carboxylic acid groups, i.e. COOH groups, as its ion-exchanging groups. The cation-exchange resin may thus be a cross-linked methacrylic acid resin. The treatment is preferably effected by passing the solution through a bed of resin, e.g. in the form of beads contained in a column.

The aqueous solution of an alkali-metal borate is suitably treated with the resin at a temperature below 100° C., but temperatures of about 80° C. (e.g. 70 to 90° C.) are preferred since they allow solutions of higher concentrations to be used than temperatures nearer ordinary room temperatures. Boric acid in a state of high purity can be crystallised from the effluent solution by lowering its temperature (e.g. from about 80° C. to room temperature). The mother liquor may be used to dissolve fresh alkali-metal borate for the production of further boric acid, and a method in accordance with this invention can thus be operated cyclically, since the cation-exchange resin, which is converted at least partially to its sodium-ion (or other alkali-metal-ion) form during the production of the boric acid, can be reconverted quantitatively to its hydrogen-ion form for use in another cycle by treatment with not substantially more than the theoretical amount of an aqueous solution of a mineral acid, e.g. sulphuric acid, hydrochloric acid, nitric acid or phosphoric acid.

The present invention will proceed using any of the alkali-metal borates, such as the sodium, potassium or lithium tetraborates, metaborates or pentaborates. Thus, for example, the sodium borates which may be used in the method according to the invention include sodium 1:2-borate decahydrate or borax, sodium 1:2-borate pentahydrate, sodium 1:2-borate tetrahydrate or kernite, and other sodium borates, including those with $Na_2O:B_2O_3$ ratios other than 1:2.

Suitable cation-exchange resins for use in the present invention are the cross-linked methacrylic acid resins sold under the names Amberlite 1 RC–50 and ZeoKarb 226 (manufactured by the Rohm & Haas Co. and by the Permutit Co. Ltd. respectively) or equivalent resins.

The present invention provides an efficient and economical method of making boric acid which has the particular advantage that it can be operated cyclically with quantitative regeneration of the weakly acidic cation-exchange resin. Also, it does not involve the physical separation from the same solution of boric acid and an alkali-metal salt other than a borate, e.g. sodium sulphate. Further, a boric acid product containing only very small amounts of impurities can be obtained from ordinary commercially available raw materials.

It will be noted here that the economics of the present invention is enhanced in that a valuable by-product, an alkali-metal salt of the mineral acid used, can be recovered from the solution recovered when the cation exchange resin is regenerated.

In a preferred method in accordance with the invention, an alkali-metal salt (e.g. sodium sulphate) is recovered as a useful by-product without resorting to evaporation of the effluent from regeneration.

This preferred method is based on the discovery by the inventors of the present invention that substantial amounts of the alkali-metal salt of the aforesaid mineral acid can be crystallised out by cooling effluent from regeneration of the resin if the aqueous solution of mineral acid prepared for the regeneration also contains in solution a certain quantity of the alkali-metal salt and if treatment of the resin with said mineral acid solution is preceded by treatment with an aqueous solution of the alkali-metal salt which contains little or none of said mineral acid. In working according to this preferred method, said mineral acid solution contains the alkali-metal salt of the mineral acid dissolved therein in an amount such that the solution is not saturated with the salt at the temperature at which it is passed over the resin but is saturated at a lower temperature, and treatment of the resin with the mineral acid solution is immediately preceded by treatment of the resin with a substantially neutral solution of the alkali-metal salt, alkali-metal salt being crystallised out of effluent resulting from the treatment with the mineral acid solution by lowering the temperature of the effluent. Thus, alkali-metal salt produced by regeneration of the resin can be recovered in an efficient and economic manner. Recovery of the salt in this way is rendered possible by the affinity of the resin for hydrogen ions.

Suitably, the mineral acid solution is substantially saturated with said salt at ambient temperature and the resin is treated with the solution at a temperature in the range 70 to 90° C.

Further mineral acid may be dissolved in a portion of the mother liquor remaining after removal of crystallised salt and the resulting solution employed for a subsequent regeneration step immediately following treatment of the resin with another unacidified portion of the mother liquor. Although no acid is added to the last-mentioned portion of the mother liquor, it will normally contain a small amount of the mineral acid, since a slight excess of the acid is usually provided in the regenerating solution. However, for the purposes of the present invention, the unacidified portion can be regarded as a substantially neutral solution, causing only insignificant reconversion of the resin to the hydrogen-ion form.

Preferably, as mentioned above, the method is operated cyclically, boric-acid-production steps in which the alkali-metal borate is treated with the resin being alternated with regeneration steps in which the resin is treated with the mineral acid solution. The resin may be washed with water before each of said production and regeneration steps.

The following examples illustrate the invention.

Example 1

292 grams of sodium 1:2-borate pentahydrate $$(Na_2B_4O_7.5H_2O)$$

were dissolved in 2220 ml. of a mother liquor containing 4.4 grams of $Na_2O$ and 133 grams of boric acid, and the resulting solution was passed through a tube containing a litre of beads of cross-linked methacrylic acid resin, i.e. a weak cation-exchange resin containing carboxylic groups. The temperatures of the tube, its contents and the solution added were maintained at 80° C. The discharged solution was allowed to cool to ambient temperature, when 218 grams of boric acid crystallised out. Analysis of the separated crystals gave:

| | |
|---|---|
| Total alkalinity | Undetectable. |
| Total boric oxide (percent) | 56.37. |
| Equivalent boric acid (percent) | 100.1. |
| Total chloride (Cl) | 50 p.p.m. |
| Total sulphate ($SO_3$) | Less than 100 p.p.m. |
| Total iron (Fe) | 4 p.p.m. |

After recovery of the boric acid, the mother liquor (2160 ml.) was analysed for $Na_2O$ content (6.5 grams) and boric acid content (152 grams); this mother liquor was then recharged with sodium borate pentahydrate for use in another cycle.

The cation-exchange resin, which was partly in the $Na^+$ form, was washed with water, treated with the theoretical amount of a 20% solution of sulphuric acid to convert it to the $H^+$ form, and then washed with water again. The discharged sodium sulphate solution was evaporated down and cooled, and $Na_2SO_4.10H_2O$ crystallised out. In an alternative, and normally preferred procedure the regeneration was effected substantially as described in the following Example 2 and sodium sulphate was obtained without evaporation.

Example 2

317.6 grams of sodium 1:2-borate pentahydrate $$(Na_2B_4O_7.5H_2O)$$

were dissolved in a mother liquor having the composition: 6.87 grams of $Na_2O$; 163.9 grams of boric acid; 2251.2 grams of water. The sodium borate solution was heated to 80° C. and passed into an ion-exchange column, also at 80° C., containing 1.2 litres of cross-linked methacrylic acid resin beads (manufactured by the Rohm & Haas Co. under the name Amberlite 1 RC-50), the flow rate being 2 litres of solution per hour. The first 625 grams of effluent from the column (called "displaced wash" since they comprise displaced wash water which was held in the column after washing in a previous cycle) were collected and retained. When all of the sodium borate solution had been added, the column was washed, first with the 625 grams of "displaced wash" and then with 1200 grams of fresh water. 2750 grams of the effluent from the column immediately following the first 625 grams (i.e. the "displaced wash") were collected and cooled to ambient temperature (20° C.), when boric acid crystallised out. The crystalline boric acid was filtered off and dried to give a yield of 281 grams (97% of theoretical yield based on the sodium borate). The product gave the analysis:

| | |
|---|---|
| Total alkalinity | Slight trace. |
| Total boric oxide (percent) | 56.28. |
| Equivalent boric acid (percent) | 99.98. |
| Total chloride (Cl) | 50 p.p.m. |
| Total sulphate ($SO_3$) | Less than 100 p.p.m. |
| Total iron (Fe) | 2 p.p.m. |

The mother liquor had the composition: 5.83 grams of $Na_2O$; 144.5 grams of boric acid; 2318 grams of water, and was retained. The remainder of the effluent was passed to waste. Due to the expansion of the resin during the above treatment (the volume of the bed of beads increased by about 50%) and to retention of water in the polymer network, all of the ingoing water was not recovered in the effluent.

930 grams of sodium sulphate liquor, saturated with sodium sulphate at ambient temperature, were divided into two portions of 209 grams and 721 grams. At a flow rate of 2 litres per hour the portion of 209 grams was passed into the column at 80° C. and followed by the other portion, after the latter had been acidulated by the addition of 112 grams of sulphuric acid (98%) and heated to 80° C. The first 600 grams of effluent ("displaced wash" containing displaced wash water from the aforesaid fresh-water wash) were collected and returned to the column after the aforesaid two portions of sodium sulphate liquor. Finally, the column was washed with 1500 grams of fresh water. The effluent from the column after the aforesaid first 600 grams was collected in three fractions, a first fraction of 623 grams (weak in sodium sulphate), a second fraction of 1284 grams (strong in sodium sulphate) and a third fraction of 1308 grams (weak in sodium sulphate). The first and third fractions were passed to waste, while the second fraction was cooled to ambient temperature, when sodium sulphate decahydrate crystallised out. The sodium sulphate was filtered off and weighed and the yield was found to be 64.6% of theoretical (based on the sulphuric acid).

The initial passage of 209 grams of sodium sulphate liquor as described above displaces intersticial water from between the resin beads and removes some of the water from the polymer network, and makes it possible to obtain subsequently a substantial fraction of effluent strong in sodium sulphate.

At the end of the regeneration stage, the volume of the bed of beads had decreased to the value which it had at the beginning of the boric-acid-production stage.

The cycle of operations was then repeated, the mother liquor left after crystallisation and removal of boric acid being used in the boric-acid-production stage, after addition of sodium borate. The second fraction of sodium sulphate liquor, after crystallisation and removal of sodium sulphate, was divided into two portions and used in the regeneration or sodium-sulphate-production stage.

If desired, the two stages may be separated by a back-washing step in which water is passed up through the column. The effluent from the top of the column may be collected and retained for use in the next back-washing step. If necessary fresh water is added to the wash liquor from time to time, and some of the wash liquor may be bled off to prevent the build up of impurities.

In order to ensure that in each cycle only the desired fraction of regeneration effluent is collected for sodium sulphate crystallisation, the electrical conductivity of the effluent may be continuously measured to indicate the concentration of sodium sulphate. Only that fraction is collected which has a concentration sufficient to crystallise out sodium sulphate on cooling to ambient temperature.

Other modes of applying the principle of the invention may be employed, change being made as regards the details described, provided the features as stated in the following claim or the equivalent of such be employed.

We, therefore, particularly point out and distinctly claim as our invention:

The cyclic process for obtaining boric acid from an aqueous alkali metal borate solution which comprises
    passing said aqueous alkali metal borate solution through a column containing a cross-linked methacrylic acid cation-exchange resin at a temperature of from about 70° C. to about 90° C.,
    collecting the effluent solution from said column,
    separating and recovering substantially pure boric acid and mother liquor from said effluent solution,
    passing a substantially neutral solution of alkali metal sulfate through said column at a temperature of from about 70° C. to about 90° C., regenerating said resin to its hydrogen ion form with an aqueous solution of sulfuric acid and said alkali metal sulfate at a temperature of from about 70° C. to about 90° C., the aqueous solution being saturated with the alkali metal sulfate at a temperature below the regenerating temperature, collecting the effluent from regenerating the resin, crystallizing alkali metal sulfate from said regenerating effluent by cooling, separating said alkali metal sulfate and mother liquor from said regenerating effluent, adding alkali metal borate to said boric acid mother liquor in such an amount as to attain about the same concentration as was present in the original alkali metal borate solution, dividing the mother liquor from said regenerating effluent into two portions, adding sulfuric acid to one of said portions in such amount as to attain about the same concentration as was present in the original solution of said sulfuric acid, returning said mother liquors to said column, and then repeating the cycle with said mother liquors.

References Cited by the Examiner

FOREIGN PATENTS 816,510    7/59    Great Britain.

OTHER REFERENCES

Kunin, R.: "Ion Exchange Resins," John Wiley and Sons, Inc., New York, 1958, pp. 53, 85–87 and 89.

Liberti: Annali di Cchimica (Rome), vol. 43, Fasc. 7, November 1953, pp. 443–447.

Meyers: "Industrial & Engineering Chemistry," vol. 35, No. 8, pages 858 to 863 (pages 861 and 863 particularly relied on), August 1943.

Osborn, G. H.: "Synthetic Ion-Exchangers," Chapman and Hall Ltd., London, 1955, pp. 16, 17 and 29.

Thompson et al. in Ind. and Eng. Chem., vol. 51, #10, October 1959, pp. 1259–1261.

MAURICE A. BRINDISI, *Primary Examiner.*

GEORGE D. MITCHELL, BENJAMIN HENKIN,
*Examiners.*